July 8, 1947.　　　　J. I. SLOAN　　　　2,423,801
APPARATUS FOR MIXING DRILLNG MUD
Filed Dec. 5, 1944
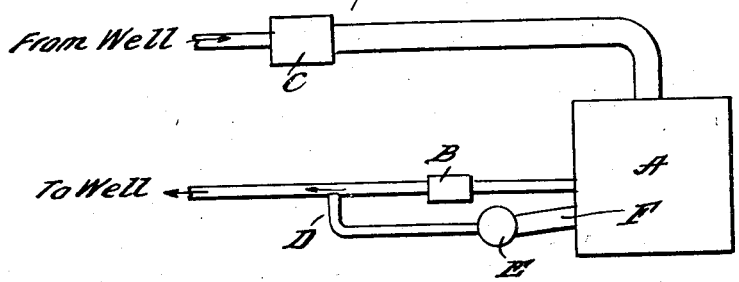
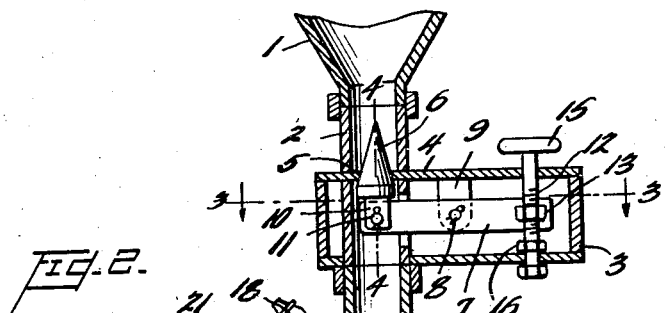
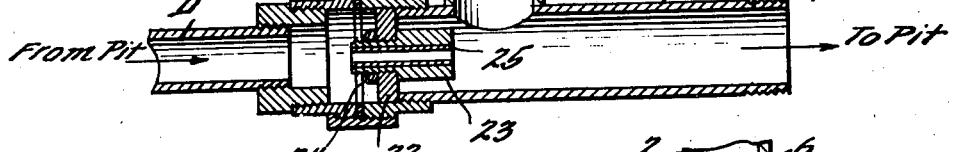
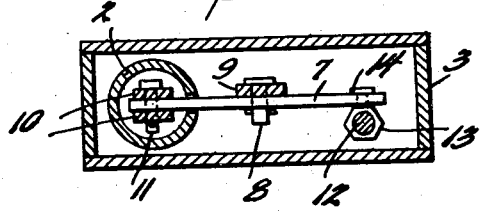
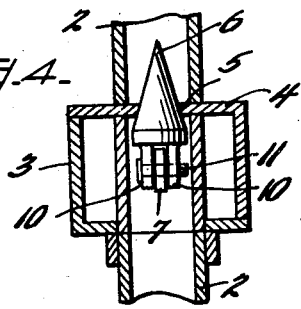
Inventor
John I. Sloan, Patented July 8, 1947

2,423,801

UNITED STATES PATENT OFFICE 2,423,801

APPARATUS FOR MIXING DRILLING MUD

John I. Sloan, Tulsa, Okla., assignor of one-fifth to John H. Poe, Tulsa, Okla.

Application December 5, 1944, Serial No. 566,736

2 Claims. (Cl. 259—4)

The invention relates to improved means for mixing the desired ingredients with drilling mud.

In the drilling of oil wells by rotary drilling rigs it is the common and well known practice to circulate under pressure drilling mud or fluid. This mud laden drilling fluid is pumped from a pit to the well, and down through the drill stem and out through the bit. It rises to the surface and is returned in the circuit to the pit after passing through a shale separator.

This drilling mud performs several well known functions, but one of its main functions is the carrying away of the cuttings. The drilling mud should be of a certain desired viscosity and should meet various other well known requirements. But in the continuous circulation of the drilling mud it deteriorates and its viscosity increases, mainly because of the fact that part of the cuttings become so thoroughly mixed with the drilling mud that it does not separate in the settling pit.

It is a well known practice to add certain chemicals to the drilling mud to maintain it in proper working condition and at the desired viscosity. The present invention is concerned with a new and improved apparatus for adding and mixing the desired chemicals with the drilling mud.

One of the objects of the invention is to provide a mixing apparatus which is operated entirely by vacuum created by the passage of the drilling mud.

Another object of the invention is to provide such an apparatus in which the amount of the powdered chemical ingredients delivered to the drilling mud will be under additional control by varying the degree of vacuum created by the stream of drilling mud; the vacuum regulation preferably being obtained by the controlled admission of air, which air further aids in mixing the ingredients with the mud.

Still another object of the invention is to provide such an apparatus in which certain parts which are subject to heavy wear can be readily removed and replaced.

A further object of the invention is to avoid the necessity for any additional pumps, which is accomplished by so positioning the mixing apparatus in the circuit that the vacuum is created by the drilling mud flowing under pressure from the main circulating pump.

Various other objects and advantages of the invention will be apparent to those skilled in the art from the following detailed description when taken in connection with the accompanying drawings, in which Figure 1 is a diagrammatic view illustrating the circulation system;

Figure 2 is a vertical sectional view of the mixing apparatus and associated parts;

Figure 3 is a horizontal sectional view taken on line 3—3 of Figure 2; and

Figure 4 is a vertical sectional view taken on line 4—4 of Figure 2.

Referring to the drawings in more detail, and particularly to Figure 1, reference character A indicates the usual settling pit from which the drilling mud is pumped under high pressure to the well by a pump B. In completing the circuit the drilling fluid preferably flows through a shale separator C and thence back to the pit.

A by-pass pipe D leads from the main circulating line back toward the pit, and the mud mixer E of the present invention is associated with this by-pass line. The section of the by-pass line indicated by reference character F, leading from the mixer to the pit, is preferably of somewhat greater diameter than that of the line leading from the main circuit to the mixer.

Referring now to Figure 2, numeral 1 indicates a conical hopper for holding a supply of the powdered chemical ingredients to be mixed with the drilling mud. This hopper, in the specific embodiment illustrated, is mounted on the upper end of sections of piping 2, the lower end of which is welded or otherwise secured to a section of the by-pass line F.

Associated with the vertical piping 2 carrying the hopper, is a casing 3 in which a valve and valve operating parts are mounted. This casing may be formed by welding the walls together or otherwise, and the casing may be welded or otherwise secured to the piping upon which the hopper is mounted. The invention is, of course, not limited to such details of construction, and it is sufficient to point out that the casing and its connection with the piping are substantially airtight.

In the form illustrated the top wall 4 of the casing 3 is provided with an opening 5, within the piping 2, to permit the flow of the powdered chemical ingredients from the hopper. This opening is controlled by an inverted cone valve 6, and the edge of the opening is preferably beveled, so that the cone when seated will tightly close the opening.

Of course, any desired means may be employed for opening the valve and for regulating the extent of opening. In the specific form shown a lever 7 is pivotally mounted on a pin 8 carried by a lug 9 attached to the top of the casing. One end of the lever is pivotally attached to the cone valve, as by spaced lugs 10 extending downwardly from the cone, and between which the end of the lever is positioned; the parts being connected by a pin 11. The other end of the lever is preferably raised and lowered by means of a threaded rod 12 upon which a nut 13 is mounted. The nut is attached to the lever by means of a pin 14 which passes through an opening in the lever and is welded to the nut. Of course, the nut cannot rotate, and hence when the rod is rotated the nut will travel up or down to open or close the cone valve to the desired extent.

The upper end of the rod passes through the top of the casing and is provided with an operating knob 15. The lower end of the rod passes through the floor of the casing, and two thin nuts 16 are keyed to the rod, one just above and the other just below the casing floor. These nuts are not tight against the floor, there being a very minute spacing, so that the rod can be freely rotated, but the nuts keep the rod from moving up and down and also act as a bearing for the rod.

A nipple 17 is welded or otherwise attached to the pipe section below the cone valve, and a stop cock air valve 18 of any ordinary construction is mounted on this nipple for regulating the admission of air.

As previously mentioned, the drilling mud is maintained in circulation by the main pump B and a by-pass leads from the main circuit back to the settling pit A. The vacuum for drawing the powdered chemical ingredients from the hopper is created by the flow of the drilling mud beneath the point where the piping 2, carrying the hopper, opens into the by-pass section F. Of course, the invention is not limited to any details of construction, but in the embodiment illustrated the by-pass sections D and F are connected by a pipe union 19 including a collar 20 which may be provided with spaced lugs 21, which may be struck with a hammer for breaking the union.

Securely mounted in one section of the union, as by welding, is a disc 22 provided with a threaded central opening. Numeral 23 refers to a portion of hexagonal bar stock which has a reduced threaded portion for mounting in the central threaded opening of the disc 22, and being secured in place by a nut 24. Mounted in the central bore of the element 23, and preferably welded thereto, is a nipple 25. This nipple is made of hard metal to resist the heavy wear resulting from the passage of the drilling mud at high pressure, which may vary from 400 to 900 pounds. Nevertheless, the life of these nipples is relatively short, and it will be apparent that a worn nipple can be removed for replacement merely by breaking the pipe union and removing the nut 24.

The diameter of the nipple 25 is considerably reduced relative to the diameter of the by-pass section D, and the outlet end of the nipple is positioned at or adjacent to the point where the piping 2 opens into the by-pass section F. Obviously the passage of the drilling mud under great pressure and at high speed from the outlet end of the nipple, beneath the opening of the piping 2, will create a vacuum therein to draw the powdered chemical ingredients from the hopper and into the flowing mud stream and thence back to the pit.

No doubt the operation of the device will be fully understood from what has been said hereinbefore, but a brief description of the operation may be helpful.

The drilling mud is maintained in circulation from the pit to the well, and back through a shale separator C to the pit, by the main circulating pump B. A by-pass line leads from the main circulating line, at a point beyond the main pump, back to the pit, and the device for supplying the chemicals is mounted in this by-pass line.

The flow of the drilling mud through the reduced nipple 25, under high pressure and at high speed, at the mouth of the piping 2, creates a vacuum in the piping which draws the powdered chemicals from the hopper 1. The outlet from the hopper is controlled by the cone valve 6, which can be regulated to adjust the volume of the delivery from the hopper. The suction at the mouth of the hopper, created by the vacuum caused by the aspirator action of the nipple 25, may be so great as to cause the powdered ingredients to tend to pack so tightly that it will not flow properly. Such a condition can be corrected by adjusting the air valve 18 to admit more air and thereby decrease the degree of vacuum or suction. And further, the admission of a regulated amount of air through the air valve aids in flowing the chemical ingredients into the liquid drilling mud, resulting in the ingredients being more thoroughly mixed with the liquid. And, as previously mentioned, the volume of the chemicals delivered to the drilling mud is additionally controlled by the adjustment of the air valve to vary the degree of vacuum.

From the foregoing description, it will be apparent that I have devised an apparatus which is extremely simple and inexpensive in construction and operation. It will also be apparent that the device is operated entirely by vacuum which is created by the high pressure mud stream, that this aspirator effect is produced by a mud stream branching from the main drilling mud circuit, so that no additional pump is necessary, that the degree of vacuum or suction, with the consequent effects on the delivery of the powdered chemicals to the drilling mud, can be finely adjusted by the regulated admission of air, and that parts which are subjected to heavy wear, such as the nipple 25, can be readily removed and replaced.

While the apparatus has been described in considerable detail, it will be understood that various changes and modifications may be made without departing from the spirit of the invention, and all such changes and modifications are intended to be included within the scope of the appended claims.

What I claim is:

1. Apparatus for mixing ingredients with drilling mud, including a settling pit, a main circulating line for conveying the drilling mud from the pit to the well and back to the pit, a pump for forcing the drilling mud through the circuit, a by-pass line leading from the main circuit, beyond the pump, back to the pit, whereby the pump forces a portion of the drilling mud through said by-pass back to the pit, a hopper for holding the ingredients and communicating with said by-pass, means for creating suction applied to the hopper, and a valve for controlling the hopper outlet.

2. Apparatus for mixing ingredients with drilling mud, including a settling pit, a main circulating line for conveying the drilling mud from the pit to the well and back to the pit, a pump for forcing the drilling mud through the circuit, a by-pass line leading from the main circuit, beyond the pump, back to the pit, whereby the pump forces a portion of the drilling mud through said by-pass back to the pit, a hopper for holding the ingredients and communicating with said by-pass, means for creating suction applied to the hopper, and a suction air valve for regulating the admission of air to regulate the degree of suction.

JOHN I. SLOAN.

REFERENCES CITED

The following references are of record in the file of this patent:

UNITED STATES PATENTS

| Number | Name | Date |
|---|---|---|
| 875,345 | Canniff | Dec. 10, 1907 |
| 1,486,883 | Holldorton | Mar. 18, 1924 |
| 2,001,506 | Smitt | May 14, 1935 |
| 2,193,219 | Boure et al. | Mar. 12, 1940 |
| 2,005,800 | O'Boyle | June 25, 1935 |
| 2,365,858 | Binkley | Dec. 26, 1944 |